US011972410B2

(12) United States Patent
Muraharirao et al.

(10) Patent No.: US 11,972,410 B2
(45) Date of Patent: Apr. 30, 2024

(54) SYSTEMS AND METHODS FOR RECONCILING LOTTERY TRANSACTIONS

(71) Applicant: Walmart Apollo, LLC, Bentonville, AR (US)

(72) Inventors: Siva Charan Muraharirao, Bangalore (IN); Hiral Roshan Salvi, Bangalore (IN); Shubham Mangla, Yamunanagar (IN); Christopher J. Hendrick, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 135 days.

(21) Appl. No.: 17/542,994

(22) Filed: Dec. 6, 2021

(65) Prior Publication Data

US 2023/0177482 A1 Jun. 8, 2023

(51) Int. Cl.
*G06Q 20/20* (2012.01)
*G07F 17/32* (2006.01)

(52) U.S. Cl.
CPC ........... *G06Q 20/20* (2013.01); *G07F 17/329* (2013.01)

(58) Field of Classification Search
CPC ....... G07F 17/329; G06Q 20/20; G06Q 30/06
See application file for complete search history.

(56) References Cited

U.S. PATENT DOCUMENTS

| 6,899,621 | B2 | 5/2005 | Behm |
| 8,311,901 | B1 | 11/2012 | Carmichael |
| 8,463,668 | B2 | 6/2013 | Youssef |
| 2003/0228910 | A1* | 12/2003 | Jawaharlal ............. G07F 17/32 463/42 |
| 2003/0236749 | A1 | 12/2003 | Shergalis |

(Continued)

OTHER PUBLICATIONS

Automate Streamlines Lottery Operations and Reporting in Louisiana [online] http://www.networkautomation.com/news/case-studies/13/[retrieved on Jun. 10, 2017] from http://www.networkautomation.com; pp. 1-3.
Baghel, "Import CSV or txt File Into SQL Server Using Bulk Insert", Code Project, May 21, 2014 (Year: 2014); pp. 1-7.
Loterity is ready to deliver complete lottery solutions [online] www.world-lotteries.org [ retrieved on [Jan. 19, 2016] Retrieved from internet http://www.world-lotteries.org/cms/index; pp. 1-4.

(Continued)

*Primary Examiner* — Florian M Zeender
*Assistant Examiner* — Milena Racic
(74) *Attorney, Agent, or Firm* — Fitch, Even, Tabin & Flannery LLP (57) ABSTRACT

There are provided systems and methods relating to reconciling lottery transactions. In one form, the system includes point-of-sale (POS) systems at retail store for inputting of first lottery transaction data for lottery transactions occurring at the retail stores in which the lottery transactions correspond to lottery games being operated by a third party. It includes a POS server for extracting the first lottery transaction data and a retailer server for receiving second lottery transaction data from a server of the third party. Further, it includes a control circuit that conducts one-to-one matching of entries of the two data sets, determines whether a discrepancy exists based on the one-to-one matching, conducts one-to-many matching by iteratively aggregating different combinations of entries of one data set and comparing them with individual entries of the other data set, and determines whether a discrepancy exists based on the one-to-many matching.

20 Claims, 8 Drawing Sheets

(56) References Cited

U.S. PATENT DOCUMENTS

| | | | |
|---|---|---|---|
| 2007/0016505 A1* | 1/2007 | Shebson | G07F 17/42 |
| | | | 705/64 |
| 2009/0149239 A1 | 6/2009 | Youssef | |
| 2010/0222125 A1 | 9/2010 | Nyman | |
| 2012/0303645 A1 | 11/2012 | Kulkarni-Puranik | |
| 2013/0268379 A1 | 10/2013 | Anderson | |
| 2014/0295946 A1 | 10/2014 | Cameron | |
| 2016/0189467 A1 | 6/2016 | Onorato | |
| 2017/0018048 A1 | 1/2017 | Christensen | |
| 2017/0018148 A1 | 1/2017 | Behm | |
| 2017/0256133 A1* | 9/2017 | Cooper | G06Q 50/34 |
| 2019/0012873 A1* | 1/2019 | Hopkins | G07F 17/3227 |
| 2019/0304258 A1* | 10/2019 | Hopkins | G07F 17/3255 |
| 2019/0355205 A1 | 11/2019 | Ghia | |
| 2020/0126037 A1* | 4/2020 | Tatituri | G06F 16/90335 |
| 2020/0184770 A1 | 6/2020 | Froelich | |

OTHER PUBLICATIONS

LottoShield; "LottoShield | Lottery Tracking System"; <https://www.lottoshield.com/>; available at least as early as Oct. 25, 2021; pp. 1–28.

U.S. Appl. No. 15/452,231; Notice of Allowance dated Aug. 20, 2020; 11 pages.

U.S. Appl. No. 15/452,231; Office Action dated Apr. 4, 2019; 17 pages.

U.S. Appl. No. 15/452,231; Office Action dated Apr. 9, 2020; 16 pages.

U.S. Appl. No. 15/452,231; Office Action dated Sep. 9, 2019; 16 pages.

Ypercube, "Convert fixed length text file into SQL", Stack Overflow, Dec. 21, 2013 (Year: 2013); pp. 1-3.

* cited by examiner

SYSTEMS AND METHODS FOR RECONCILING LOTTERY TRANSACTIONS

TECHNICAL FIELD

This invention relates generally to reconciling lottery transactions, and more particularly, to reconciling retail store lottery transaction data with third-party lottery transaction data.

BACKGROUND

In the retail setting, tickets for lottery games are frequently available for purchase at retail stores. These lottery games may include, for example, instant scratch card games (where there may be an instant result) and draw games (where a winning combination of numbers may be generated at a later date). These lottery games are often administered and operated by the different states and/or by third-party administrators. When a lottery game or ticket is purchased at the retail store, this lottery transaction is recorded in two different systems. The lottery transaction is recorded at a third-party terminal (such as a vending machine or over-the-counter terminal), and it is also recorded at a point-of-sale device of the retail store by the store employee.

There is a need for reconciling the lottery transaction data of the two different systems. It has been found that the POS device often records a lesser sales amount or higher redemption amount than the third-party terminal, and it is desirable to determine the reason for the discrepancy to mitigate such instances further. Because individual lottery transactions may sometimes be aggregated into a single purchase at the POS device, it is often difficult to reconcile these aggregated purchases with the individual lottery transactions. In addition, inputting some lottery purchases into the POS device may be delayed instead of inputting immediately after the lottery transactions were performed at the third-party terminal. Thus, there exists a need to take these considerations into account when reconciling the two sets of lottery transaction data.

BRIEF DESCRIPTION OF THE DRAWINGS

Disclosed herein are embodiments of systems, apparatuses and methods for reconciling lottery transactions. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one form," "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification do not all refer to the same embodiment.

Generally speaking, pursuant to various embodiments, systems, apparatuses and methods are provided herein for reconciling lottery transactions. In one form, the system includes: a plurality of point-of-sale (POS) systems at a plurality of retail stores configured for input of first lottery transaction data for lottery transactions occurring at the retail stores, the lottery transactions corresponding to lottery games being operated by a third party separate from the retail stores; a POS server communicatively coupled to the plurality of POS systems, the POS server configured to extract the first lottery transaction data; and a retailer server configured to receive second lottery transaction data from a server of the third party, the retailer server configured to receive the second lottery transaction data in a standardized format or to transform the second lottery transaction data to a standardized format. The system also includes a control circuit communicatively coupled to the POS server and to the retailer server, the control circuit configured to: conduct one-to-one matching by comparing individual entries of the first lottery transaction data inputted on the POS systems with individual entries of the second lottery transaction data; determine whether a discrepancy exists between the first lottery transaction data and the second lottery transaction data based on the one-to-one matching; conduct one-to-many matching by iteratively aggregating different combinations of entries of second lottery transaction data and comparing individual entries of first lottery transaction data inputted on the POS systems with the different combinations of second lottery transaction data; determine whether a discrepancy exists between the first lottery transaction data and the second lottery transaction data based on the one-to-many matching; and generate a report of any identified discrepancies.

In some implementations, in the system, the control circuit is configured to determine that a discrepancy exists based on the one-to-one matching by determining that each individual entry of the first lottery transaction data does not match an individual entry of the second lottery transaction data. In some implementations, the control circuit is configured to determine that no discrepancy exists based on the one-to-many matching by determining that each individual entry of the first lottery transaction data inputted on the POS systems matches a combination of entries of the second lottery transaction data. In some implementations, the control circuit is configured to determine that a discrepancy exists based on the one-to-many matching by determining that each individual entry of the first lottery transaction data inputted on the POS systems does not match a combination of entries of the second lottery transaction data. In some implementations, the control circuit is configured to identify one or more entries of the second lottery transaction data that are not included in any of the entries of the first lottery transaction data. In some implementations, the POS server is configured to receive a first timestamp for each entry of the first lottery transaction data; the retailer server is configured to receive a second timestamp for each entry of the second lottery transaction data; and the control circuit is configured to conduct one-to-one matching by initially comparing individual entries of first and second lottery transaction data based on the temporal proximity of the first and second timestamps. In some implementations, the POS server is configured to receive a first timestamp for each entry of the first lottery transaction data; the retailer server is configured to receive a second timestamp for each entry of the second lottery transaction data; and the control circuit is configured to conduct one-to-many matching by initially aggregating combinations of entries of second lottery transaction data determined by the second timestamp and comparing each combination to entries of first lottery transaction data determined by the first timestamp. In some implementations, the control circuit is configured to: conduct many-to-one matching by iteratively aggregating different combinations of entries of second lottery transaction data and comparing the different combinations of entries of second lottery transaction data with individual entries of first lottery transaction data in a different manner than the one-to-many matching; and determine whether a discrepancy exists between the first lottery transaction data and the second lottery transaction data based on the many-to-one matching. In some implementations, each of the retail stores includes vending machines or over-the-counter terminals operated by the third party where lottery transactions are performed. In some implementations, the lottery transactions comprise at least one of sales of lottery game tickets and redemption of winning lottery game tickets. In some implementations, the lottery games comprise at least one of instant scratch card games and draw games.

In another form, there is provided a method for reconciling lottery transactions including: by a plurality of point-of-sale (POS) systems at a plurality of retail stores, receiving input of first lottery transaction data for lottery transactions occurring at the retail stores, the lottery transactions corresponding to lottery games being operated by a third party separate from the retail stores; by a POS server communicatively coupled to the plurality of POS systems, extracting the first lottery transaction data; by a retailer server receiving second lottery transaction data from a server of the third party, receiving the second lottery transaction data in a standardized format or transforming the second lottery transaction data to a standardized format. The method further includes, by a control circuit communicatively coupled to the POS server and to the retailer server: conducting one-to-one matching by comparing individual entries of the first lottery transaction data inputted on the POS systems with individual entries of the second lottery transaction data; determining whether a discrepancy exists between the first lottery transaction data and the second lottery transaction data based on the one-to-one matching; conducting one-to-many matching by iteratively aggregating different combinations of entries of second lottery transaction data and comparing individual entries of first lottery transaction data inputted on the POS systems with the different combinations of second lottery transaction data; determining whether a discrepancy exists between the first lottery transaction data and the second lottery transaction data based on the one-to-many matching; and generating a report of any identified discrepancies.

As an overview, this disclosure is directed generally to lottery games sold at retail stores that may be managed and run by third-party administrators under state governments and/or by vendors acting on their behalf. The sale transactions (purchase of lottery games) and redemption transactions (turning in winning lottery tickets) are often done on terminal machines managed by these state administrators and/or vendors. In order to maintain these transaction details on the retailer side, the store associates generally capture the lottery third-party terminal transactions in the point-of-sale (POS) system just like the sale of any other general merchandise. As a reseller, the retailer receives invoices from the states/third parties for the net amount of sale and redemption of games at retail stores.

However, the amount of the invoices has generally been higher than the net amount of sale/redemption of games. This is due to the discrepancy between the transactions captured on the state/third-party lottery terminals and on the retailer's POS terminals. This discrepancy (or shrinkage) may be due to various factors, such as, for example, lack of proper training of store associates, associate malfeasance or inadvertence, and issues related to specific lottery games. Thus, it is desirable to improve the efficiency and visibility of the lottery operations at the stores by being able to determine missing and variant lottery transactions and take corrective action.

In one aspect, this disclosure involves addressing various issues to facilitate reconciliation of the two data sets. One issue is unavailability of a common field between the two data sources to match the transaction from POS and the transaction from the third-party lottery terminal. Another issue involves the actions of store associates where not every transaction from the third-party lottery terminal is captured in the retailer POS terminal immediately i.e., there may be a delay in inputting transactions at the POS terminal. Also, there may be jumbled order of transactions, i.e., transactions may be inputted at the POS terminal in a different order than transacted at the third-party lottery terminal. Further, in some cases, store associates may aggregate multiple transactions at the end of the shift or after a few transactions and input them as a single transaction.

The claimed reconciliation system should be efficient enough to overcome the above challenges and match the transactions by running multiple one-to-one, one-to-many, and/or many-to-one iterations between data from state/third-party owned lottery terminals and retailer terminals. This efficiency improves upon some other reconciliation systems that may involve single one-to-one transaction matching because, for example, those systems do not address situations where multiple individual lottery transactions have been aggregated into one purchase/transaction at the POS system or where there may have been a delay in inputting a lottery transaction in the POS system. It is desirable to provide a solution generating detailed transaction level mismatch information to reduce the discrepancy between state/third-party lottery terminals and the retailer's POS terminals.

Figure 1:
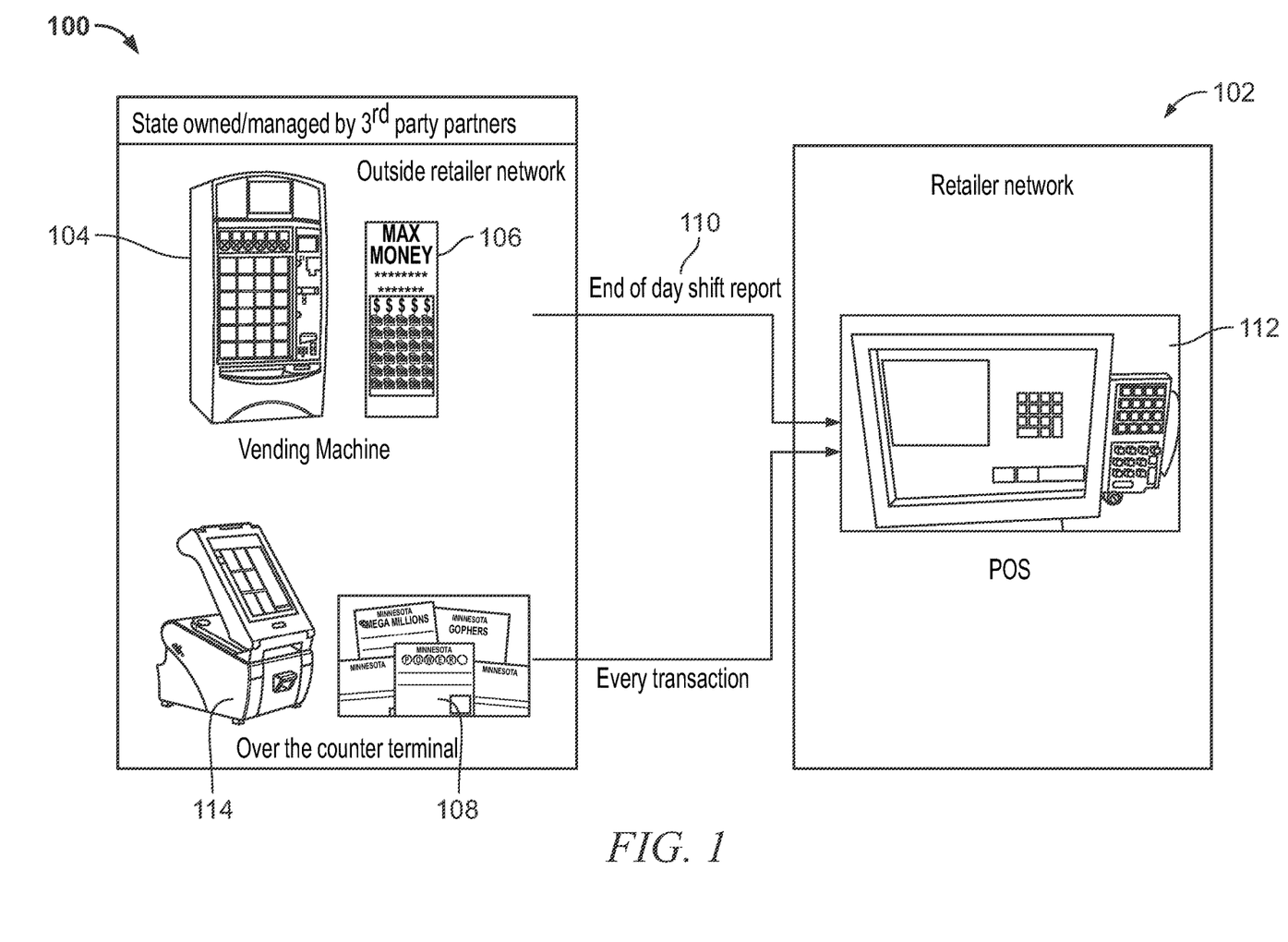
FIG. 1 is a schematic diagram in accordance with some embodiments.

Referring to FIG. 1, there is shown a schematic diagram showing the two different networks 100, 102 handling lottery transactions. Network 100 is a third-party network that handles lottery transactions for the state owned/managed lottery games. This network 100 generally includes various machines and terminals at which individuals may purchase tickets for lottery games.

As can be seen in FIG. 1, one example of a machine at a retail store for the purchase of lottery tickets/cards is a vending machine 104. In some forms, vending machines 104 may be used to sell and dispense various lottery games, such as scratch cards/instant games 106 or tickets for draw games 108. A scratch card generally refers to a card or ticket where a player scratches the coating from one of more areas of the card to reveal words or symbols underneath, which indicate whether the player has won a prize. The player can determine immediately whether he or she has a winning card or ticket. On the other hand, draw games generally refer to lottery games where a combination of numbers are drawn at a draw event, and the player seeks to match the drawn numbers with the numbers on his or her card. In this instance, the player must generally wait for the draw event before he or she can determine whether the ticket is a winning ticket.

Vending machines 104 generally track individual lottery transactions as they occur. In one form, an end of day shift report 110 may be generated listing all of the individual lottery transactions. This end of day shift report 110 may be transmitted to the retailer's POS system 112 either over a network or manually. Where an end of day shift report 110 is transmitted electronically or over a network to the POS system 112, there may be a relatively lower likelihood of missed or variant transactions.

Another example of a device at a retail store for the sale of lottery games is an over-the-counter terminal 114. In some forms, these terminals 114 may also be used to sell and dispense tickets for various lottery games, such as scratch cards/instant games 106 or draw games 108. In some forms, these terminals generate tickets and/or receipts, and in turn, these tickets and/or receipts may be inputted into a POS device such as by scanning a barcode. In some instances, multiple tickets/receipts may be aggregated into a single purchase, or there may be a delay in inputting the tickets/receipts, such as waiting until the end of the associate's work shift to input them (or waiting until some free interval of time).

There are generally two types of lottery transactions. The first type of lottery transaction is the sale of lottery games to the players, such as the sale of scratch card/instant games and the sale of draw games. The second type of lottery transaction is the redemption of winning tickets. The same issues in reconciliation can apply to both types of lottery transactions, and this disclosure generally applies to facilitate reconciliation of both types of transactions.

The following tables show some examples of the aggregation of individual lottery transactions for sales and redemptions. As shown in Table 1, the associate has entered multiple transactions at the over-the-counter terminal as a single transaction/purchase in the POS system, including aggregation of game level amounts. As shown in Table 2, multiple redemptions made at the over-the-counter terminal have been aggregated as a single redemption transaction at the POS system.

TABLE 1

Multiple sales transactions at over-the-counter terminal aggregated at POS terminal

| Over-the-counter Terminal | POS Terminal |
|---|---|
| Transaction 1 - Game 1 - 2 × $10 = $20 | Transaction 1 |
| Transaction 2 - Game 2 - 3 × $5 = $15 | Game 1 - $35 |
| Transaction 3 - Game 1 - 1 × $15 = $15 | Game 2 - $15 |
| Transaction 4 - Game 4 - 1 × $20 = $20 | Game 4 - $20 |

TABLE 2

Multiple redemptions at over-the-counter terminal aggregated at POS terminal

| Over-the-counter Terminal | POS Terminal |
|---|---|
| Transaction 1 - Redemption 1 - 1 × $10 = $10 | Transaction 1 |
| Transaction 2 - Redemption 2 - 1 × $5 = $5 | Redemption 1 - 1 × $30 = $30 |
| Transaction 3 - Redemption 3 - 1 × $15 = $15 | |

Figure 2:
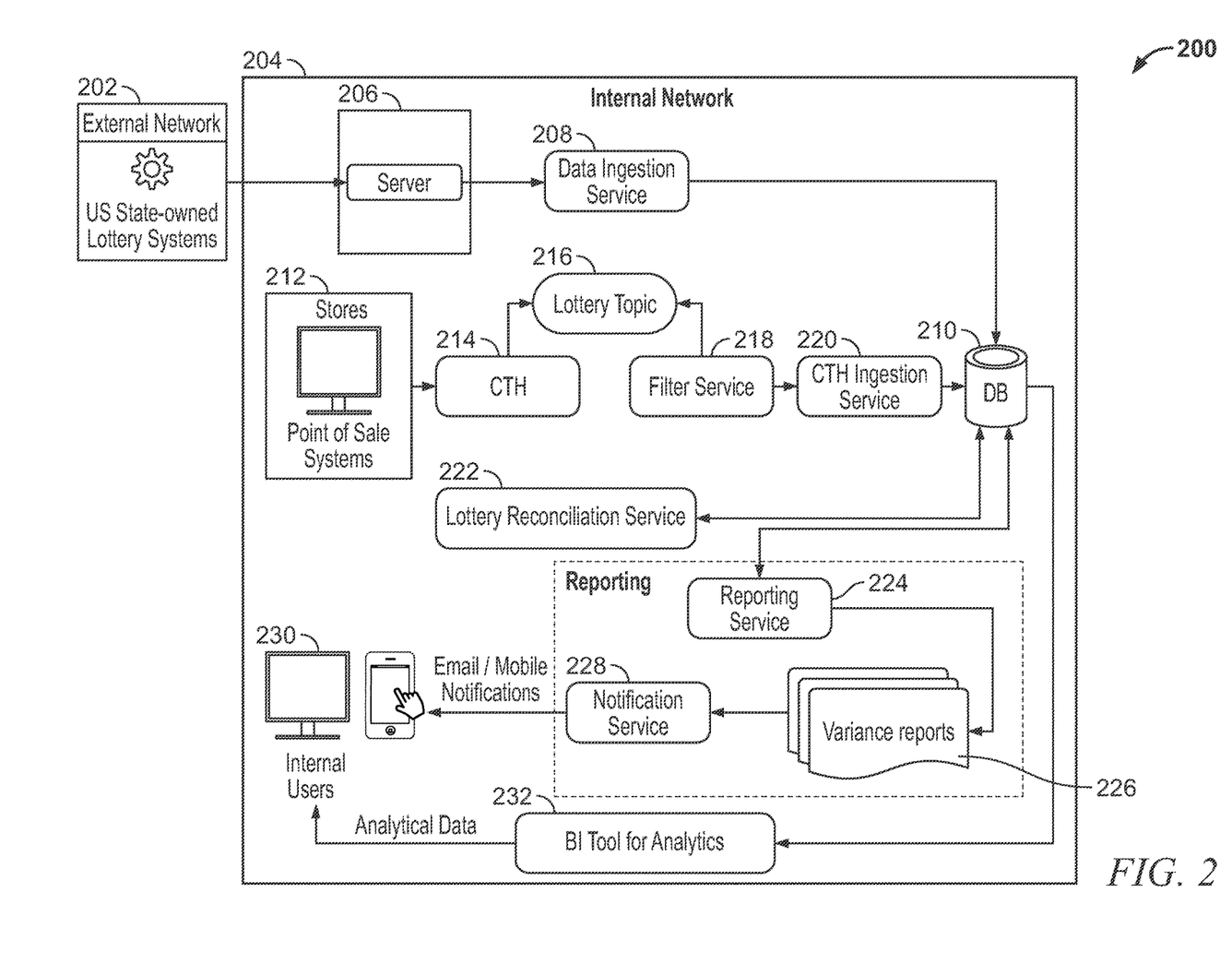
FIG. 2 is a block diagram in accordance with some embodiments.

FIG. 2 shows one example of architecture for a reconciliation system 200. The system 200 is in communication with an external network 202, which is generally controlled and operated by a state-owned lottery system (and/or administered by a third party administrator on that state's behalf). This external network 202 is in communication and/or has received lottery transaction data from third-party terminals (such as vending machines and/or over-the-counter terminals described above). This lottery transaction data is one set of data that need to be reconciled. The external network 202 transmits this lottery transaction data to the retailer's internal network 204 in a certain format that can be used by the internal network 204 (or in a format that can be transformed by the internal network 204 to a different usable one).

A server 206 receives the lottery transaction data from the external network 202. In one form, the server 206 may, for example, be a server that is configured for secure file transfers, which, in turn, transfers the information via a secure data ingestion service 208. It should be understood that any of various file transfer protocols and services may be used to receive the lottery transaction data from the external network 202. The information is then transferred to a database 210, which may, for example, in one form be a managed cloud database or a database that runs on a cloud computing platform. As stated, the lottery transaction data is received in a standardized format or is received in one format (such as, for example, a flat file text format or other text file) that can be transformed to a standardized format (tabular format).

Next, another set of lottery transaction data has been inputted on the retailer's POS systems 212. In one form, it is generally contemplated that the retailer may include numerous transactions (not just lottery-related transactions), and the retailer may need to filter out (or extract) the lottery transactions from other general merchandise transactions. In one form, the customer transaction history 214 and a lottery topic/universal product code (UPC) 216 may be used to isolate the lottery transactions from the other general merchandise transactions. More specifically, a filter (or extraction) service 218 may be used to sort through all of the transactions and select only the lottery transaction data. This lottery transaction data is then transferred via a customer transaction history (CTH) ingestion service 220 to the database 210.

A control circuit (or lottery reconciliation service 222) then compares the two sets of lottery transaction data in the database 210. These comparison and matching steps are described in greater detail below. Any variances in the two data sets (including missing transactions in the POS systems) can then be identified and reported. In one form, it is contemplated that this variance information is communicated to a reporting service 224, which generates variance or reconciliation reports 226, and a notification service 228 transmits the variance reports 226 to specific internal users 230 at the retailer. It is also contemplated that the business intelligence tools 232 may be used to analyze the two sets of lottery transaction data in the database 210 for additional insight and to transmit this analysis to the internal users 230.

Figure 3:
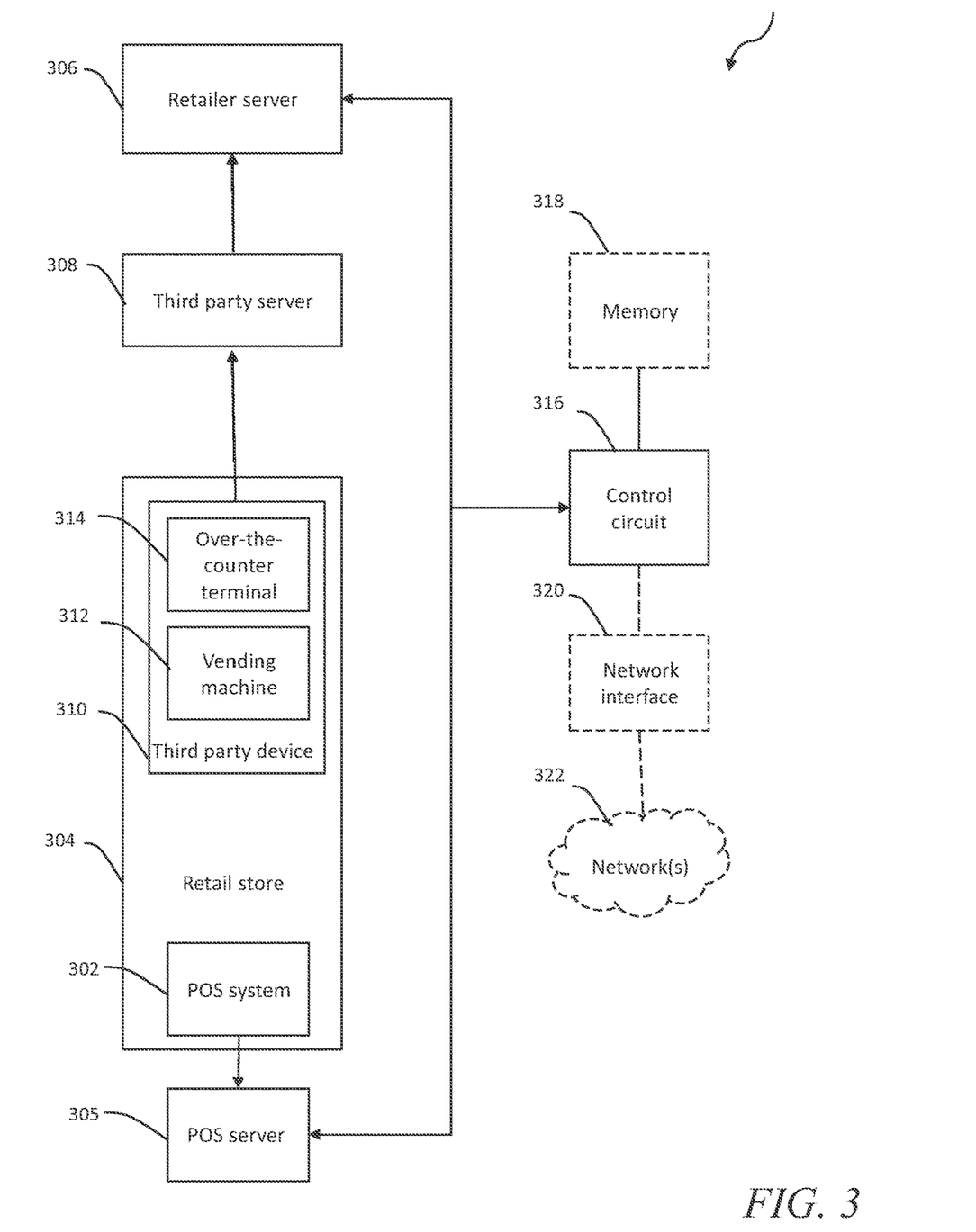
FIG. 3 is a block diagram in accordance with some embodiments.

Referring to FIG. 3, there is shown a system 300 for reconciling lottery transactions. This system 300 incorporates and supplements the system 200 and components shown in FIGS. 1 and 2. As stated above, the system 300 shows various components in reconciling first lottery transaction data (inputted at POS systems at retail stores) and second lottery transaction data (received at third-party terminals). In one form, it is contemplated that reconciliation is performed on a daily basis (or more frequently).

The system 300 includes point-of-sale (POS) systems 302 at retail stores 304 for inputting first lottery transaction data for lottery transactions occurring at the retail stores 304. It is generally contemplated that any of various types of POS devices and systems may be used, which are well known in the retail area. The lottery transactions correspond to lottery games being operated by a third party separate from the retail store 304. As stated above, the lottery games are generally state-administered lottery games, which may be operated by vendors or third parties on the state's behalf. The first lottery transaction data is the information that is in the retailer's own system or network.

The system 300 further includes a POS server 305 communicatively coupled to the plurality of POS systems 302. The POS server 305 may be directly coupled to the plurality of POS systems 302, or it may be coupled through one or more intermediate devices or systems. The POS server 305 is configured to extract the first lottery transaction data from the total general merchandise data at the POS systems 302, such as by, for example, UPC identifiers.

The system 300 also includes a retailer server 306 for receiving second lottery transaction data from a third-party server 308. In one form, it is contemplated that the third-party server 308 is in communication with third-party terminals 310 at the retail store 304, such as vending machines 312 and/or over-the-counter terminals 314. These devices are referred to as third-party terminals 310 not necessarily based on ownership of the devices but rather based on the fact that they receive the second lottery transaction data that is received and/or controlled by the third party. In turn, the retailer server 306 receives the second lottery transaction data in a standardized format from the third party, or it transforms the received data into a standardized format.

As shown in FIG. 3, the control circuit 316 is coupled to a memory 318 and to a network interface 320 and wireless network(s) 322. The memory 318 can, for example, store non-transitorily computer instructions that cause the control circuit 316 to operate as described herein, when the instructions are executed, as is well known in the art. Further, the network interface 320 may enable the control circuit 316 to communicate with other elements (both internal and external to the system 300). This network interface 320 is well understood in the art. The network interface 320 can communicatively couple the control circuit 316 to the wireless network 322 and whatever other networks 322 may be appropriate for the circumstances. The control circuit 316 may form part of, be coupled to, or in communication with a server of the retail store 304 and may make use of cloud databases and/or operate in conjunction with a cloud computing platform. For example, the control circuit 316 may be coupled to one or more databases (such as database 210) that store the first lottery transaction data and/or the second lottery transaction data.

The control circuit 316 is communicatively coupled to the POS server 305 and to the retailer server 306. The control circuit 316 conducts one-to-one matching by comparing individual entries of the first lottery transaction data inputted on the POS systems 302 with individual entries of the second lottery transaction data. One-to-one matching generally refers to matching one entry or record from the first data set (first lottery transaction data) with one entry or record from the second data set (second lottery transaction data).

The control circuit 316 determines whether a discrepancy exists between the first lottery transaction data and the second lottery transaction data based on the one-to-one matching. In one form, the control circuit 316 is configured to determine that a discrepancy exists based on the one-to-one matching by determining that each individual entry of the first lottery transaction data does not match an individual entry of the second lottery transaction data. In one circumstance, this one-to-one matching can readily address the situation where there has been no aggregation of lottery transactions into a single transaction and where each entry or record involves a single lottery transaction. In this circumstance, if the corresponding entries all match, the control circuit 316 can quickly determine that there is no missing or variant transaction without the need for further comparisons or calculations.

However, if there is no exact match of corresponding entries, the control circuit 316 can proceed to conduct further comparisons to address possible aggregation of transactions. The control circuit 316 conducts one-to-many matching by iteratively aggregating different combinations (or subsets) of entries of second lottery transaction data and comparing individual entries of first lottery transaction data inputted on the POS systems with the different combinations of second lottery transaction data. Without performing this one-to-many comparison, the control circuit 316 may indicate in some circumstances that a number of missing or variant transactions are present, but such missing or variant transactions may actually have been aggregated into a single transaction. In other words, the control circuit 316 might give a false result.

The control circuit 316 determines whether a discrepancy exists between the first lottery transaction data and the second lottery transaction data based on the one-to-many matching. The control circuit 316 seeks to account for all the lottery transactions in the data sets. If, following the one-to-many matching, the control circuit 316 has accounted for all the transactions in each data set, then there are no missing or variant transactions. On the other hand, if the control circuit 316 has not accounted for all of the transactions in each data set, the unmatched transactions constitute missing or variant transactions. The control circuit 316 generates a report of any identified discrepancies. One-to-one matching and one-to-many matching allow identification of errors in both the POS data and in the third-party data.

In one form, the control circuit 316 conducts one-to-many matching to determine if a store associate combined multiple lottery purchases into one POS transaction. The control circuit 316 determines that no discrepancy exists based on the one-to-many matching when it determines that each individual entry of the first lottery transaction data inputted on the POS system 302 matches a combination of entries of the second lottery transaction data. On the other hand, the control circuit 316 determines that there is a discrepancy/variance if it cannot match combinations of lottery purchases to each individual POS transaction. The control circuit 316 determines that a discrepancy exists based on the one-to-many matching when it determines that each individual entry of the first lottery transaction data inputted on the POS system 302 does not match a combination of entries of the second lottery transaction data. In this circumstance, the control circuit 316 can determine the discrepancies/variances. The control circuit 316 identifies as discrepancies/variances the entries of the second lottery transaction data that are not included in any of the entries of the first lottery transaction data.

Any of various types of one-to-one matching algorithms and one-to-many matching algorithms with a subset rule may be used. However, it is contemplated that the matching/comparisons may be expedited by making use of timestamps for the lottery transactions. It is generally contemplated that many (although not all) of the lottery transactions at the POS system 302 and at the third-party terminals 310 will occur close in time to one another. So, in one form, in order to expedite the one-to-one matching, the POS system 302 receives a first timestamp for each entry of the first lottery transaction data, the retailer server receives a second timestamp for each entry of the second lottery transaction data, and the control circuit 316 is configured to conduct one-to-one matching by initially comparing individual entries of first and second lottery transaction data based on the temporal proximity of the first and second timestamps. Similarly, in one form in order to expedite the one-to-many matching, in addition to the receiving the first and second timestamps, the control circuit 316 conducts one-to-many matching by initially aggregating combinations of entries of second lottery transaction data determined by the second timestamp and comparing each combination to entries of first lottery transaction data determined by the first timestamp.

In one form, it is contemplated that the control circuit 316 may also conduct rematching after the one-to-many matching. This rematching may involve many-to-one matching of combinations of multiple lottery machine transactions with individual POS transactions in a different manner than the one-to-many matching. This many-to-one matching or comparison may be especially useful for redemptions of winning lottery game tickets. In this form, the control circuit 316 conducts many-to-one matching by iteratively aggregating different combinations of entries of second lottery transaction data and comparing the different combinations of entries of second lottery transaction data with individual entries of first lottery transaction data in a different manner than the one-to-many matching, and by then determining whether a discrepancy exists between the first lottery transaction data and the second lottery transaction data based on the many-to-one matching. Although any of various algorithms may be used for many-to-one matching, it is again generally contemplated that the matching may be expedited by making use of timestamps for the lottery transactions.

Figure 4:
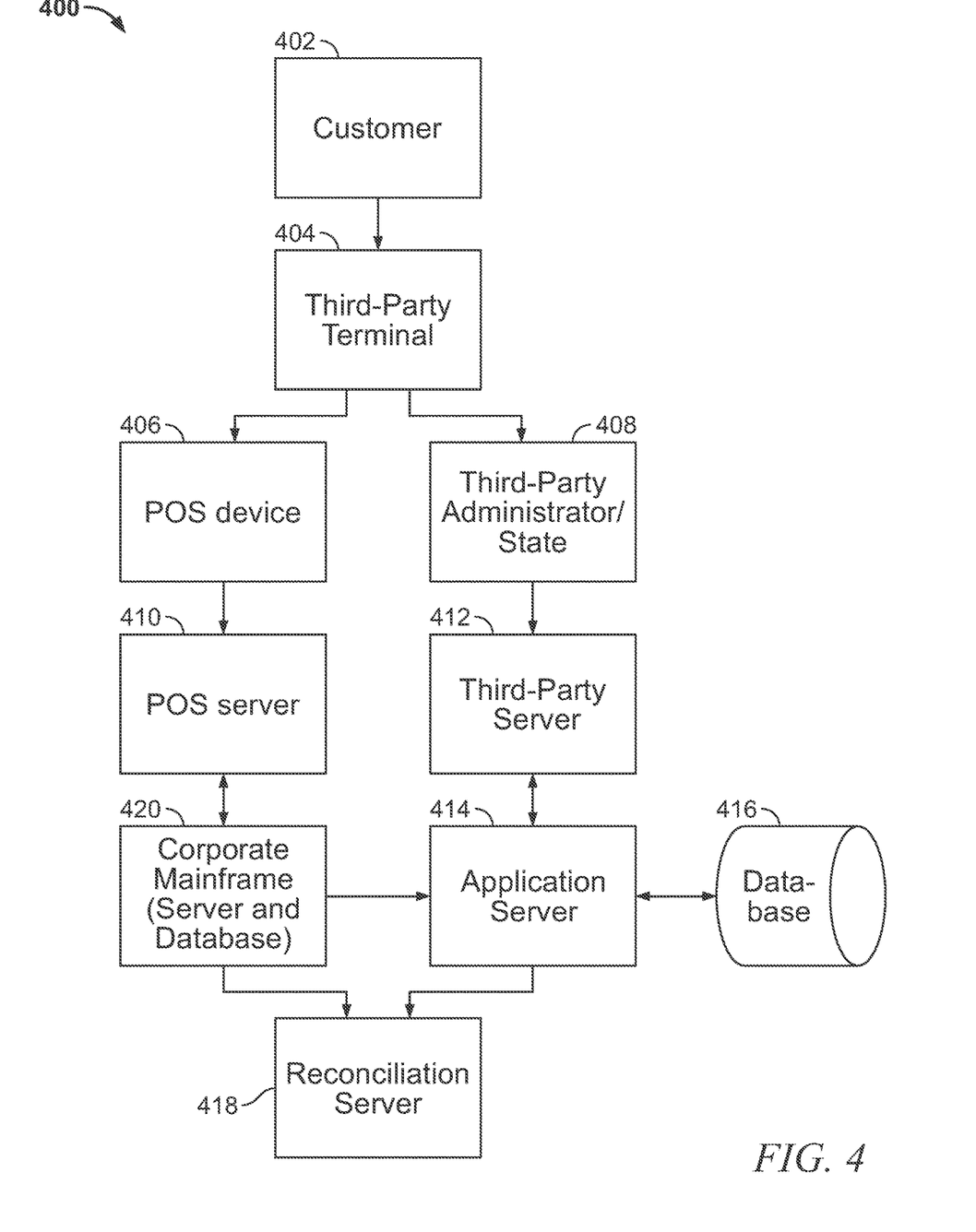
FIG. 4 is a block diagram in accordance with some embodiments.

Referring to FIG. 4, there is shown a system 400 for reconciliation of lottery transactions of two data streams. A customer 402 purchases a lottery game ticket or redeems a winning ticket using a third-party terminal 404 (such as a vending machine or over-the-counter terminal). In one form, the third-party terminal 404 prints out a lottery ticket or redemption voucher, and an associate scans or otherwise inputs the printed ticket or voucher at a POS device/system 406. A data record for the transaction is also transmitted to the third party administrator/state 408. The transaction data generated from scanning/inputting the ticket or voucher at the POS device/system 406 is transmitted to a POS server 410. In one form, it is generally contemplated that the POS server 410 is receiving lottery transaction data from a number of POS devices/systems 406 at different store locations.

The data record for the transaction on a daily basis is transmitted to an intermediary or third-party server 412, which forwards the data record across a corporate firewall to an application server 414 within a corporate infrastructure (similar to retailer server 306). In one form, the data record received from the third-party may be received in one format (such as, for example, a flat file text format or other text file) that may need to be converted to another format (such as, for example, a tabular format) in order to facilitate matching and reconciliation. In one form, the data record received from the third-party server 412 is processed, parsed, and converted from a text format to a data tabular format and stored in a database 416. Transaction data is extracted daily and transmitted to a reconciliation server 418 (similar to control circuit 316), and POS inputted data is extracted from a POS database (which may be at a corporate mainframe 420) and sent to the reconciliation server 418 on a daily basis. The reconciliation server 418 performs the matching of third-party administrator/state extracted data and the POS data and identifies any discrepancies.

In one form, the POS system, application server and the reconciliation server are in communication with one another via an internal corporate network. In this form, the third-party server is not in direct communication with the internal corporate network and transmits data to the application server across a firewall.

It is generally contemplated that the application server, reconciliation, server, and POS server are controlled by an entity affiliated with a plurality of POS systems. In this form, the system is a distributed reconciliation system that enables the entity controlling the POS systems to efficiently perform daily reconciliation of the lottery transaction data received from both the third-party server and the individual POS systems after transforming the data from the third party. This approach solves a computer-centric problem and provides additional security benefits by removing the reconciliation process from local POS system locations. Similar examples of systems and architecture are described in U.S. Publication No. 2017/0256133, the contents of which are incorporated herein by reference in its entirety.

Figure 5:
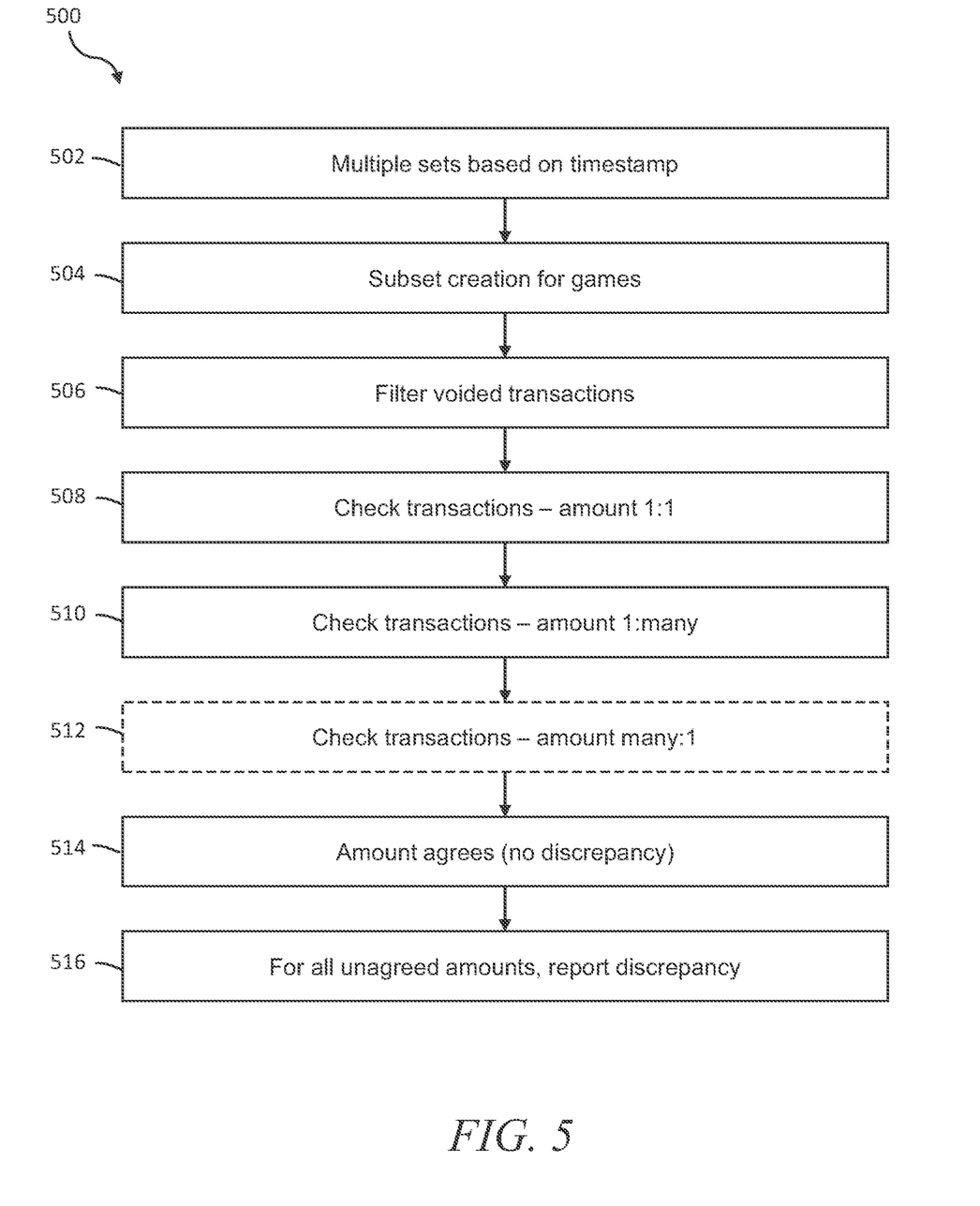
FIG. 5 is a flow diagram in accordance with some embodiments.

Referring to FIG. 5, there is shown a process or group of pass rules 500 for reconciling first lottery transaction data at the POS system and second lottery transaction data at third-party terminals. Initially, some pre-reconciliation activity is performed, which does not necessarily occur in the following order. At block 502, multiple sets (or combinations) are generated based on the timestamp of the transactions. As stated above, the matching can often be expedited by initially focusing on transactions that are near to each other in time. At block 504, subsets are created for lottery games, and the two different data streams of lottery transactions are compared using subset matching methods based on the timestamp. Smaller subsets are created from a large dataset for accurate and expedited matching. The maximum size of the subsets may be selected so as to balance accuracy of matching and speed of matching. At block 506, voided transaction are filtered out from the two data streams.

Next, various matching approaches may be used. It is generally contemplated that one-to-one matching is performed (block 408), and if all transactions can be matched using this approach, then the reconciliation can be performed quickly. However, it is also generally contemplated that one-to-many matching is performed (block 510) comparing individual entries of the POS data to multiple entries of the third-party data. This matching iteratively uses subset matching and addresses potential aggregation of lottery transactions by store associates. Further, for some circumstances (such as redemptions), it is contemplated that it may be desirable to perform additional aggregation matching as an additional check. In this form, many-to-one matching (block 512) is conducted in which multiple entries of the third-party data are compared to individual entries of the POS data.

Then, following the matching, the results are determined, which may result in reporting and notification. At block 514, the amounts agree and there is no discrepancy. At block 516, on the other hand, the amounts do not agree and there is a discrepancy. The missing transactions or variant transactions are identified and reported.

Figure 6:
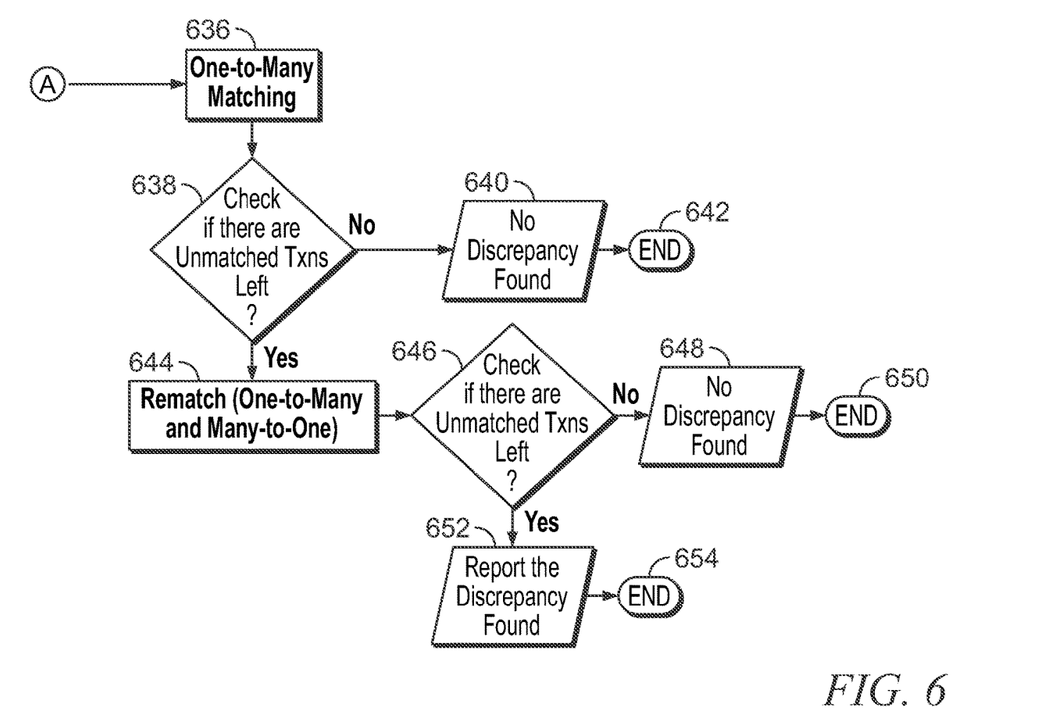
FIG. 6 is a flow diagram in accordance with some embodiments.

Referring to FIG. 6, there is shown a process 600 for reconciling lottery transaction data involving different types of lottery transactions and games. At block 602, the process 600 starts and the type of lottery transaction is determined at block 604. More specifically, it is determined whether the lottery transaction is a sale, a redemption, or a vending machine transaction. At block 606, if the transaction type is a sale, orders are retrieved based on game name and universal product code (UPC). At block 608, if the transaction type is a redemption, orders are retrieved based on redemption UPCs. At block 610, if the transaction is a vending machine transaction, orders are retrieved based on vending machine summary item UPCs.

The process 600 then applies matching approaches based on the transaction type. At block 612, one-to-one matching is performed, and at block 614, it is determined if all of the individual entries of the two lottery transaction data sets match. At block 616, all of the individual entries match, no discrepancy is found, and the process ends at block 618. At block 614, if all of the individual entries do not match, the process 600 then proceeds to check the transaction type at block 620.

In this form, one-to-one matching is generally considered sufficient for vending machine transactions. At block 622, for vending machines, any discrepancy that has been found is reported, and the process ends at block 623. In one form, for vending machines, an end of day shift report is generated listing the aggregated values of all the lottery transactions. In this form, there is little likelihood of aggregation or combining of these individual transactions into a single entry. The vending machine transactions are automated, and aggregation behavior has generally not been observed. Thus, in this form, in view of the low likelihood of aggregation, one-to-one matching is deemed sufficient.

At block 620, if the transaction type is a sale, the process 600 proceeds to one-to-many matching at block 624. Individual entries of first lottery transaction data (from the POS systems) are matched with or compared to multiple entries of second lottery transaction data (such as from over-the-counter terminals). At block 626, it is determined whether there are any unmatched transactions remaining following iterative subset matching. At block 628, if no discrepancy is found, the process 600 ends at block 630. At block 632, if an unmatched transaction is remaining, the discrepancy is reported, and then the process 600 ends at block 634. At this stage, the two data sets have undergone one-to-one matching and one-to-many matching, and missing/variant data in the first lottery transaction data (from the POS system) constitute variant sales transactions and are reported.

At block 620, if the transaction type is a redemption, the process 600 proceeds to one-to-many matching at block 636. Initially, the process 600 relating to redemption transactions is similar to that described above for sales transactions. Individual entries of first lottery transaction data are matched with or compared to multiple entries of second lottery transaction data. At block 638, following one-to-many matching, it is determined whether there are any unmatched transactions remaining. At block 640, if no discrepancy is found, the process 600 ends at block 642.

However, in this form, redemption transactions may undergo additional matching comparisons. At block 644, if an unmatched transaction is remaining following one-to-many matching, the two data sets undergo rematching in a forward and/or a reverse direction. In other words, the two data sets undergo forward one-to-many matching (as described above), and/or the two data sets undergo reverse many-to-one matching. In the many-to-one matching, multiple entries of second lottery transaction data are matched against individual entries of first lottery transaction data, so the matching is performed in the reverse direction starting with the second lottery transaction data (data from third-party terminals). In one form, it may be desirable to perform rematching for redemption transactions (and not sales transaction). It may be determined that accuracy is more important for redemption transactions and that it is more important to find any and all missing or variant redemption transactions. In this form, this desire for accuracy for redemption transactions offsets the additional time and resources required for the additional searching.

After rematching, at block 646, it is determined whether there are any unmatched transactions remaining. At block 648, if no discrepancy is found, the process 600 ends at block 650. At block 652, if an unmatched transaction is remaining, the discrepancy is reported, and then the process 600 ends at block 654. At this stage, the two data sets have undergone, at least, one-to-one matching and one-to-many matching and may have further undergone additional one-to-many matching and/or many-to-one matching. The amount of matching to be performed balances the desire for accuracy with the time and resources required for additional searching. Any missing/variant data in the first lottery transaction data (from the POS system) constitute variant redemption transactions and are reported.

Figure 7:
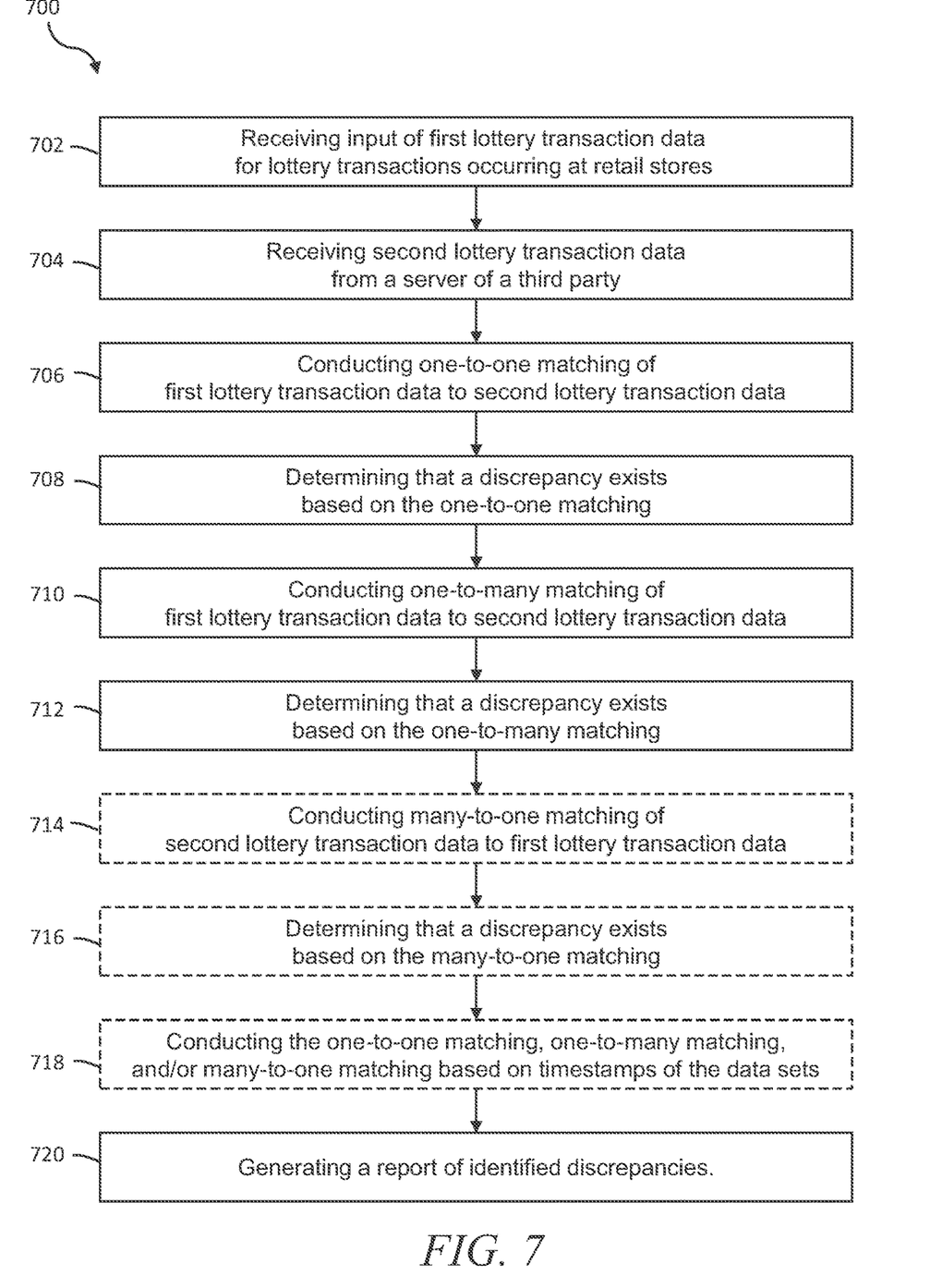
FIG. 7 is a flow diagram in accordance with some embodiments.

Referring to FIG. 7, there is shown a process 700 for reconciling two sets of lottery transaction data. More specifically, the process 700 reconciles first lottery transaction data (from POS systems) with second lottery transaction data (from third-party terminals) and identifies discrepancies. In one form, it is contemplated that reconciliation is performed on, at least, a daily basis. This process 700 may incorporate one or more of the elements described above in systems 200, 300, and 40 and shown in FIGS. 1-4. Further, this process 700 summarizes and incorporates the processes 500 and 600 described above. As should be understood, these steps do not necessarily occur in the specific order in which they are presented.

At block 702, input of first lottery transaction data for lottery transactions occurring at retail stores is received. This first lottery transaction data is received at POS systems. It is generally contemplated that the first lottery transaction data is inputted by store associates at the retail stores. The first lottery transaction data may be inputted in any of various manners, such as, for example, scanning a UPC or manually inputting the data into a POS device.

At block 704, second lottery transaction data from a server of a third party is received in a standardized format (or the received data is transformed into a standardized format after receipt). It is generally contemplated that the retail stores include certain lottery game devices (such as, for example, vending machines and over-the-counter terminals) that dispense lottery game tickets and cards. These lottery game tickets and cards may, for example, include instant games/scratch cards and draw game tickets. These lottery games are often administered by individual states, and vendors and third parties (not the retailer) may receive lottery data from these devices.

At block 706, one-to-one matching of first lottery transaction data to second lottery transaction data is conducted. Individual entries of the first lottery transaction data are matched against or compared to individual entries of the second lottery transaction data. At block 608, it is determined that a discrepancy exists between the two data sets based on the one-to-one matching. The process 700 then continues to the next step to determine whether this discrepancy may have been due to aggregation of certain individual lottery transactions into a single transaction (or whether the discrepancy may be possibly due to other reasons).

At block 710, one-to-many matching of first lottery transaction data to second lottery transaction data is conducted. This matching approach is an iterative approach. Under this matching approach, different combinations of entries of second lottery transaction data are iteratively aggregated, and individual entries of first lottery transaction data inputted on the POS system are compared iteratively with the different combinations of second lottery transaction data. It is generally contemplated that the different combinations are subsets of the second lottery transaction data. The maximum size of the subsets may be selected based on a desired balancing of the accuracy of the matching and the speed of the matching. At block 712, it is determined that a discrepancy exists based on the one-to-many matching.

Blocks 714, 716, and 718 show additional optional matching steps that may be performed. At block 714, many-to-one matching of second lottery transaction data to first lottery transaction data is conducted. For certain transactions (such as, for example, redemption transactions), it may be determined that additional accuracy is desired so that additional matching will be performed. Many-to-one matching is a form of rematching that is performed in the reverse direction from the earlier one-to-many matching that was performed. At block 716, it is determined that a discrepancy exists based on the many-to-one matching.

At block 718, it is contemplated that timestamps are utilized to expedite some or all of the above matching approaches. More specifically, the one-to-one matching, the one-to-many matching, and/or the many-to-one matching may be conducted based on timestamps of the two data steps. It is generally contemplated that much of the corresponding lottery transaction data in each data set will be close in temporal proximity. So, some or all of the matching approaches will initially attempt to match transactions from the two data sets that are close to each other in time. This timestamp approach may lead to quicker matching in some circumstances and possibly with the use of fewer resources.

At block 720, a report of identified discrepancies is generated. It is generally contemplated that the report may include details regarding the discrepancy transactions, including, for example, one or more of order identification, the game name, the amount, the transaction time, the store register identification, and the store associate identification. This report enables taking corrective actions, such as, for example, corrective training of associates or revision of POS procedures. The reconciliation and report can identify issues related to specific operators, daily traffic-related opportunities that may be impacting lottery transactions, and specific product/game related issues. The reconciliation and report may also help identify issues involving the third-party data at the third-party terminals, including, for example, identifying vending machines and over-the-counter terminals that are defective or faulty in some way (or that generate errors in certain data fields).

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for reconciling lottery transactions comprising:
   a plurality of individual point-of-sale (POS) systems at a plurality of retail stores configured for input of first lottery transaction data for lottery transactions occurring at the retail stores, the lottery transactions corresponding to lottery games being operated by a third party separate from the retail stores;
   a POS server communicatively coupled to the plurality of individual POS systems, the POS server configured to receive the first lottery transaction data of the individual POS systems;
   a retailer server configured to receive second lottery transaction data from a server of the third party, the retailer server configured to:
     receive the second lottery transaction data in a third party format; and
     transform the second lottery transaction data from the third party format to a standardized retailer format;
   a control circuit communicatively coupled to the POS server and to the retailer server, the control circuit configured to:
     extract sales data from the first lottery transaction data, the extracted sales data comprising a sales amount for each lottery transaction occurring at the retail stores;
     extract sales data from the transformed second lottery transaction data, the extracted sales data comprising a sales amount for each lottery transaction of the transformed second lottery transaction data;
     conduct one-to-one matching by comparing individual sales amounts of the first lottery transaction data inputted on the POS systems with individual sales amounts of the transformed second lottery transaction data;
     determine whether a discrepancy exists between the first lottery transaction data and the transformed second lottery transaction data based on the one-to-one matching;
     conduct one-to-many matching by iteratively aggregating different combinations of sales amounts of transformed second lottery transaction data and comparing individual sales amounts of first lottery transaction data inputted on the POS systems with the different combinations of aggregated sales amounts of transformed second lottery transaction data;

determine whether a discrepancy exists between the first lottery transaction data and the transformed second lottery transaction data based on the one-to-many matching; and generate a report of any identified discrepancies.

2. The system of claim 1, wherein the control circuit is configured to determine that a discrepancy exists based on the one-to-one matching by determining that each individual entry of the first lottery transaction data does not match an individual amount of the second lottery transaction data.

3. The system of claim 2, wherein the control circuit is configured to determine that no discrepancy exists based on the one-to-many matching by determining that each individual sales amount of the first lottery transaction data inputted on the POS systems matches a combination of aggregated sales amounts of the second lottery transaction data.

4. The system of claim 3, wherein the control circuit is configured to determine that a discrepancy exists based on the one-to-many matching by determining that each individual sales amount of the first lottery transaction data inputted on the POS systems does not match a combination of aggregated sales amounts of the second lottery transaction data.

5. The system of claim 4, wherein the control circuit is configured to identify one or more sales amounts of the second lottery transaction data that are not included in any of the sales amounts of the first lottery transaction data.

6. The system of claim 1, wherein:
the POS server is configured to receive a first timestamp corresponding to each sales amount of the first lottery transaction data;
the retailer server is configured to receive a second timestamp corresponding to each sales amount of the second lottery transaction data; and
the control circuit is configured to conduct one-to-one matching by initially comparing individual sales amounts of first and second lottery transaction data based on the temporal proximity of the first and second timestamps.

7. The system of claim 1, wherein:
the POS server is configured to receive a first timestamp corresponding to each sales amount of the first lottery transaction data;
the retailer server is configured to receive a second timestamp corresponding to each sales amount of the second lottery transaction data; and
the control circuit is configured to conduct one-to-many matching by initially aggregating combinations of sales amounts of second lottery transaction data determined by the second timestamp and comparing each combination to individual sales amounts of first lottery transaction data determined by the first timestamp.

8. The system of claim 1, wherein the control circuit is configured to:
conduct many-to-one matching by iteratively aggregating different combinations of sales amounts of second lottery transaction data and comparing the different combinations of aggregated sales amounts of second lottery transaction data with individual sales amounts of first lottery transaction data in a different manner than the one-to-many matching; and determine whether a discrepancy exists between the first lottery transaction data and the second lottery transaction data based on the many-to-one matching.

9. The system of claim 1, wherein each of the retail stores includes vending machines or over-the-counter terminals operated by the third party where lottery transactions are performed.

10. The system of claim 1, wherein the lottery transactions comprise at least one of sales of lottery game tickets and redemption of winning lottery game tickets.

11. The system of claim 1, wherein the lottery games comprise at least one of instant scratch card games and draw games.

12. A method for reconciling lottery transactions comprising:
by a plurality of individual point-of-sale (POS) systems at a plurality of retail stores, receiving input of first lottery transaction data for lottery transactions occurring at the retail stores, the lottery transactions corresponding to lottery games being operated by a third party separate from the retail stores;
by a POS server communicatively coupled to the plurality of individual POS systems, receiving the first lottery transaction data of the individual POS systems;
by a retailer server receiving second lottery transaction data from a server of the third party, receiving the second lottery transaction data in a third party format and transforming the second lottery transaction data from the third party format to a standardized retailer format;
by a control circuit communicatively coupled to the POS server and to the retailer server:
extracting sales data from the first lottery transaction data, the extracted sales data comprising a sales amount for each lottery transaction occurring at the retail stores;
extracting sales data from the transformed second lottery transaction data, the extracted sales data comprising a sales amount for each lottery transaction of the transformed second lottery transaction data;
conducting one-to-one matching by comparing individual sales amounts of the first lottery transaction data inputted on the POS systems with individual sales amounts of the transformed second lottery transaction data;
determining whether a discrepancy exists between the first lottery transaction data and the transformed second lottery transaction data based on the one-to-one matching;
conducting one-to-many matching by iteratively aggregating different combinations of sales amounts of transformed second lottery transaction data and comparing individual sales amounts of first lottery transaction data inputted on the POS systems with the different combinations of aggregated sales amounts of transformed second lottery transaction data;
determining whether a discrepancy exists between the first lottery transaction data and the transformed second lottery transaction data based on the one-to-many matching; and
generating a report of any identified discrepancies.

13. The method of claim 12, further comprising, by the control circuit:
determining that a discrepancy exists based on the one-to-one matching by determining that each individual sales amount of the first lottery transaction data does not match an individual sales amount of the second lottery transaction data.

14. The method of claim 13, further comprising, by the control circuit:
    determining that no discrepancy exists based on the one-to-many matching by determining that each individual sales amount of the first lottery transaction data inputted on the POS systems matches a combination of aggregated sales amounts of the second lottery transaction data.

15. The method of claim 14, further comprising, by the control circuit:
    determining that a discrepancy exists based on the one-to-many matching by determining that each individual sales amount of the first lottery transaction data inputted on the POS systems does not match a combination of aggregated sales amounts of the second lottery transaction data.

16. The method of claim 15, further comprising, by the control circuit:
    identifying one or more sales amounts of the second lottery transaction data that are not included in any of the sales amounts of the first lottery transaction data.

17. The method of claim 12, further comprising:
    by the POS server, receiving a first timestamp corresponding to each sales amount of the first lottery transaction data;
    by the retailer server, receiving a second timestamp corresponding to each sales amount of the second lottery transaction data; and
    by the control circuit, conducting one-to-one matching by initially comparing individual sales amounts of first and second lottery transaction data based on the temporal proximity of the first and second timestamps.

18. The method of claim 12, further comprising:
    by the POS server, receiving a first timestamp corresponding to each sales amount of the first lottery transaction data;
    by the retailer server, receiving a second timestamp corresponding to each sales amount of the second lottery transaction data; and
    by the control circuit, conducting one-to-many matching by initially aggregating combinations of sales amounts of second lottery transaction data determined by the second timestamp and comparing each combination to individual sales amounts of first lottery transaction data determined by the first timestamp.

19. The method of claim 12, further comprising, by the control circuit:
    conducting many-to-one matching by iteratively aggregating different combinations of sales amounts of second lottery transaction data and comparing the different combinations of aggregated sales amounts of second lottery transaction data with individual sales amounts of first lottery transaction data in a different manner than the one-to-many matching; and
    determining whether a discrepancy exists between the first lottery transaction data and the second lottery transaction data based on the many-to-one matching.

20. The method of claim 12, wherein each of the retail stores includes vending machines or over-the-counter terminals operated by the third party where lottery transactions are performed.

* * * * *